April 22, 1947.  P. E. STILLE  2,419,298
ENGINE FUEL VAPORIZER
Filed Sept. 15, 1943  3 Sheets-Sheet 2

Inventor
Paul E. Stille
By Clarence A. O'Brien
and Harvey B. Jacobson
Attorneys

April 22, 1947.  P. E. STILLE  2,419,298
ENGINE FUEL VAPORIZER
Filed Sept. 15, 1943  3 Sheets-Sheet 3

Inventor
Paul E. Stille

By Clarence A. O'Brien
and Harvey B. Jacobson
Attorneys

Patented Apr. 22, 1947

2,419,298

UNITED STATES PATENT OFFICE 2,419,298

ENGINE FUEL VAPORIZER

Paul E. Stille, Royal Oak, Mich.

Application September 15, 1943, Serial No. 502,547

1 Claim. (Cl. 251—76)

The present invention relates to new and useful improvements in fuel vaporizers for internal combustion engines, and has for one of its important objects to provide, in a manner as hereinafter set forth, novel means for recovering from the exhaust fuel values or fumes which would be otherwise wasted and mixing them with the ingoing charge at a point between the carburetor and the intake manifold.

Another very important object of the invention is to provide a vaporizer of the aforementioned character comprising a unique construction and arrangement for mixing with the ingoing charge filtered air, oil vapors and water vapors in addition to the exhaust fumes.

Still another very important object of the invention is to provide an engine fuel vaporizer of the character described comprising novel means for controlling or regulating the aforementioned air, vapors and fumes.

Other objects of the invention are to provide an engine fuel vaporizer which will be comparatively simple in construction, strong, durable, highly efficient and reliable in operation, and which may be manufactured and installed at low cost.

All of the foregoing, and still further objects and advantages of the invention will become apparent from a study of the following specification, taken in connection with the accompanying drawing wherein like characters of reference designate corresponding parts throughout the several views, and wherein.

Figure 1:
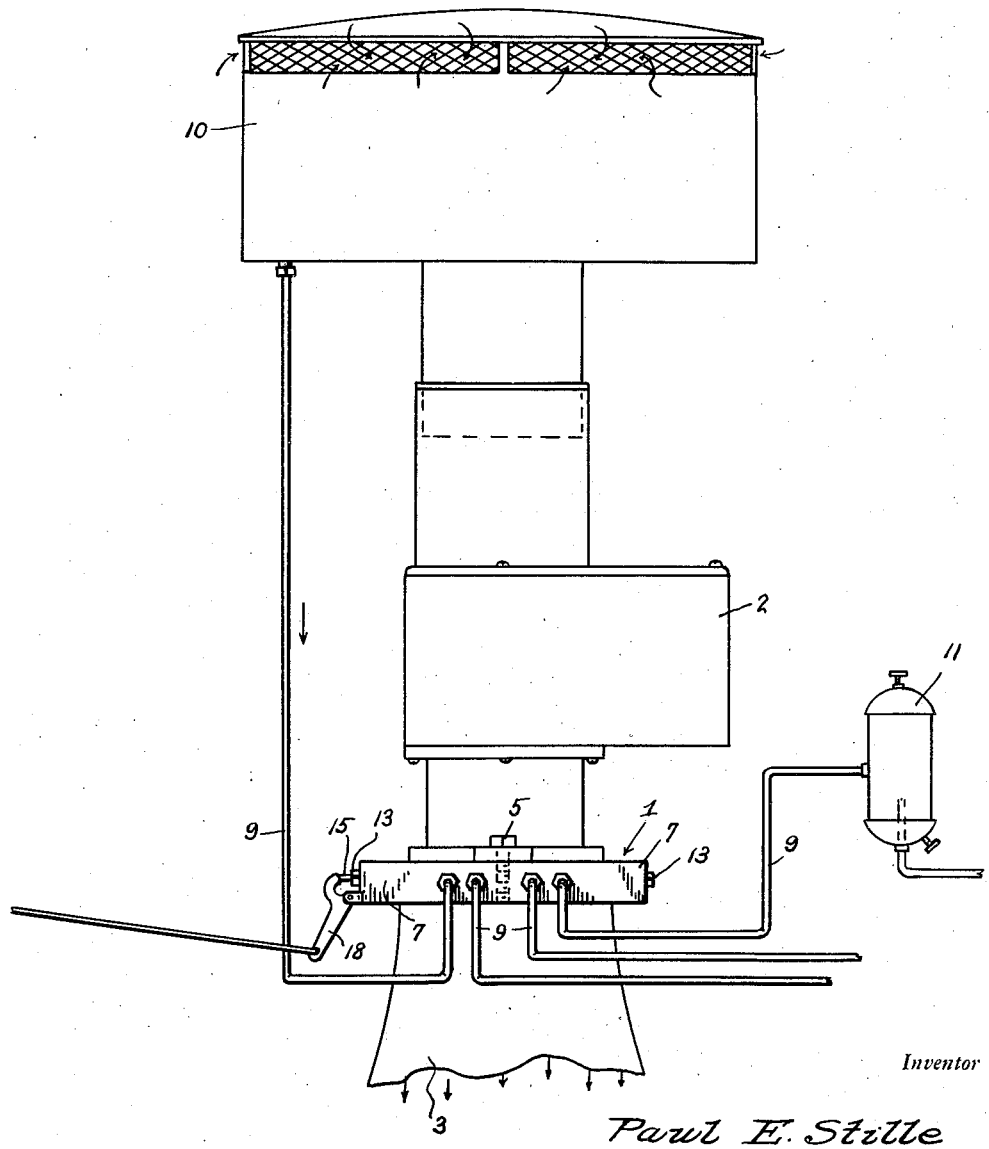
Figure 1 is an elevational view, showing a vaporizer constructed in accordance with the present invention installed between the carburetor and the intake manifold of an engine.
Figure 2:
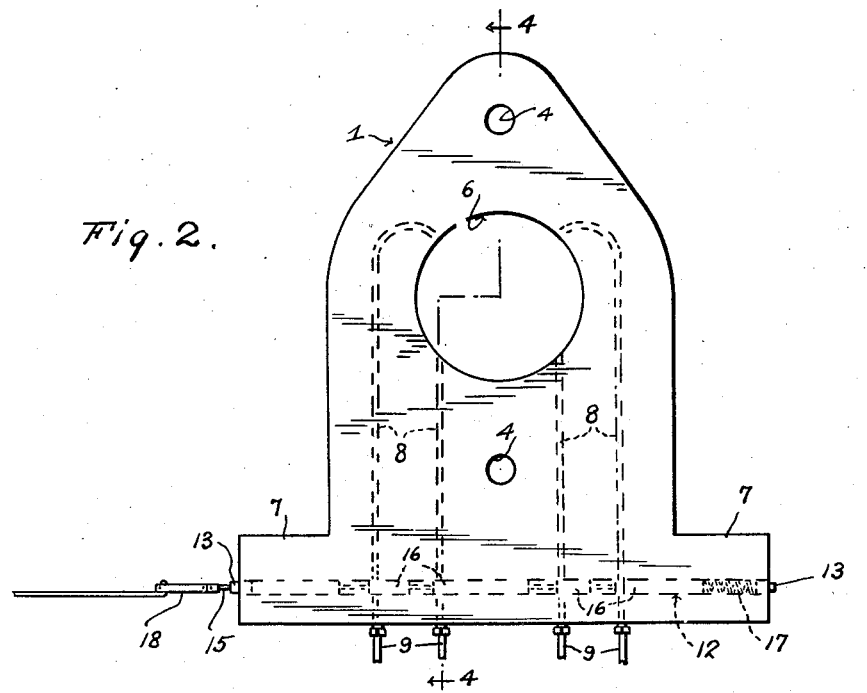
Figure 2 is a top plan view of the device.
Figure 3:
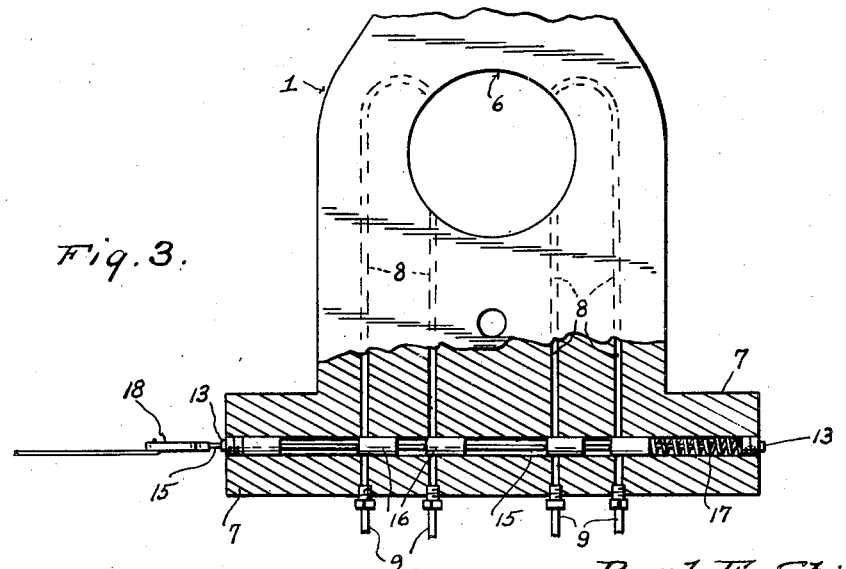
Figure 3 is a plan view of the device with an end portion thereof broken away in section to expose the control or regulating means.
Figure 4:
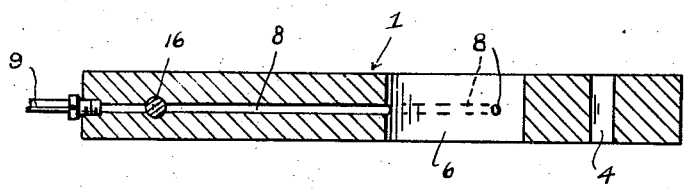
Figure 4 is a view in vertical longitudinal section through the device, taken substantially on the line 4—4 of Figure 2.
Figure 5:
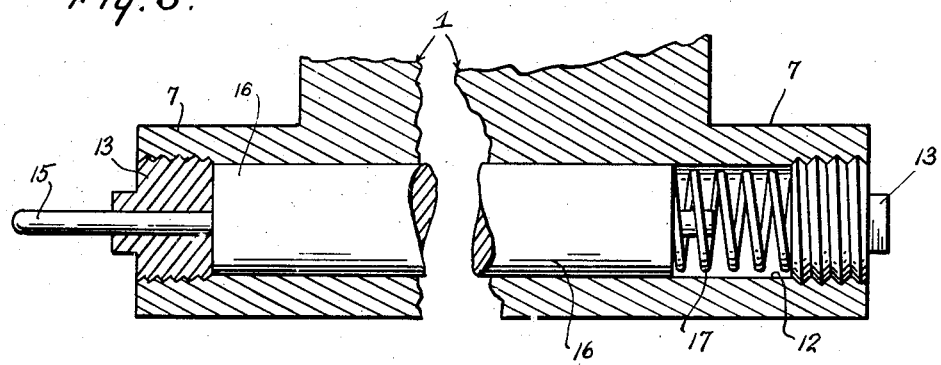
Figure 5 is an enlarged, fragmentary view through the control means.
Figure 6:
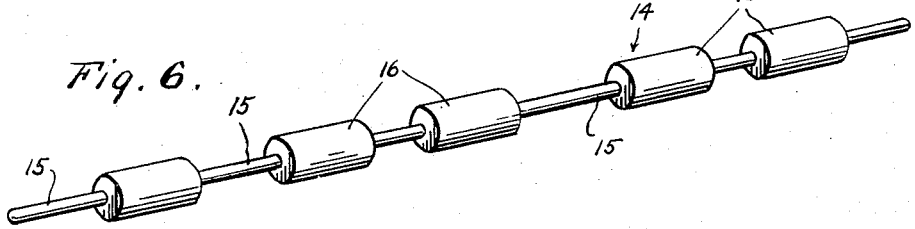
Figure 6 is a perspective view of the reciprocating valve member.

Referring now to the drawing in detail, it will be seen that reference numeral 1 designates a plate of suitable material which is adapted to be mounted between the carburetor 2 and the intake manifold 3 of an engine. Toward this end, the plate 1 has formed therein openings 4 which accommodate the securing bolts 5. The plate 1 is further provided with an opening 6 for the passage of fuel from the carburetor 2 to the manifold 3.

The plate 1 further includes a laterally enlarged end portion 7. Extending into the plate 1 from the end 7 thereof and communicating with the opening 6 are a plurality of ducts 8. Pipes 9 are connected, at one end, to the plate 1 and communicate with the ducts 8. As illustrated to advantage in Figure 1 of the drawing, one of the pipes 9 is connected to the usual air cleaner 10 of the engine. Another of the pipes is to be connected to the exhaust manifold or pipe of the engine, this pipe having interposed therein a filter 11. Another of the pipes 9 is to be connected to the radiator of the vehicle at the top thereof for receiving water vapors therefrom. The remaining pipe 9 is to be connected to the tappet cover of the engine for drawing off oil vapors.

Extending transversely through the end portion 7 of the plate 1 is a bore 12 which intersects the ducts 8. Removable screw plugs 13 close the ends of the bore 12. Mounted for reciprocation in the bore 12 for controlling the ducts 8 is a valve member which is designated generally by reference numeral 14. In the embodiment shown, the valve member 14 includes a stem 15 which is provided, at spaced points, with cores 16.

A coil spring 17 in one end portion of the bore 12 yieldingly urges the valve 14 toward closed position. One end portion of the stem 15 extends slidably through the adjacent plug 13. An operating lever 18 is pivotally mounted on the plate 1 and engaged with the exposed end of the stem 15 for opening the valve 14 against the tension of the coil spring 17.

It is thought that the operation of the device will be readily apparent from a consideration of the foregoing. Briefly, to cause the device to function, the valve 14 is actuated against the tension of the coil spring 17 for opening the ducts 8. When this occurs, the suction created by the engine draws air, oil and water vapors, and exhaust fumes into the ingoing fuel from the carburetor 2 through the pipes 9.

Figure 7:
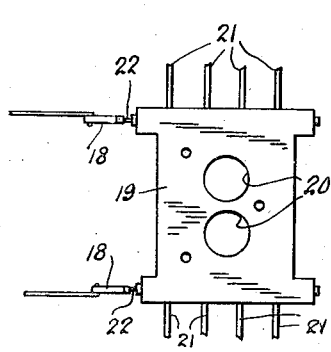
Figure 7 is a plan view of a slight modification.

The modification illustrated in Figure 7 of the drawing is for engines having dual carburation. Toward this end, a plate 19 is provided having a pair of fuel openings 20 therein. Communicating with each of the openings 20 is a set of pipes 21 which are similar to the pipes 9. Also, control valves 22, similar to the valve 14, are provided for each opening 20.

It is believed that the many advantages of an engine fuel vaporizer constructed in accordance with the present invention will be readily understood, and although preferred embodiments of the device are as illustrated and described, it is to be understood that further modifications and changes in the details of construction may be resorted to which will fall within the scope of the invention as claimed.

What is claimed is:

A device of the character described comprising a flat plate formed with a plurality of ducts extending longitudinally in the plate with their outer ends opening through the outer side edge face of the plate, the outer end of said plate being formed with a bore extending transversely of the plate and intersecting said ducts, removable plugs closing ends of said bore, a rod extending longitudinally in said bore and projecting outwardly through one plug, blocks for closing the ducts firmly mounted upon said rod in spaced relation to each other and fitting snugly in the bore, a spring in said bore having one end abutting a plug and its other end abutting a block and urging the rod longitudinally to a normal position disposing the blocks in a closed position across the ducts, and an operating member engaging the outer end of the rod.

PAUL E. STILLE.

REFERENCES CITED

The following references are of record in the file of this patent:

UNITED STATES PATENTS

| Number | Name | Date |
|---|---|---|
| 1,609,234 | Wilson | Nov. 30, 1926 |
| Re. 19,811 | Moore | Jan. 7, 1936 |
| 1,118,865 | Johnston | Nov. 24, 1914 |
| 1,619,082 | Marsh | Mar. 1, 1927 |
| 2,005,624 | Kowalski | June 18, 1935 |
| 2,158,819 | Gianatasio | May 16, 1939 |
| 2,152,028 | Church | Mar. 28, 1939 |
| 1,432,751 | Hallett | Oct. 24, 1922 |
| 2,220,653 | Jeffrey | Nov. 5, 1940 |
| 1,430,803 | Dunn et al. | Oct. 3, 1922 |
| 1,630,242 | Ross | May 24, 1927 |
| 1,816,345 | Secor | July 28, 1931 |